United States Patent
Yamada

(10) Patent No.: US 10,979,577 B2
(45) Date of Patent: Apr. 13, 2021

(54) ELECTRONIC DEVICE AND IMAGE FORMING APPARATUS PROVIDING USER WITH WORK ENVIRONMENT FOR CREATING SEARCH FORMULA WHOSE SEARCH IS TARGETED ON LOG

(71) Applicant: KYOCERA Document Solutions Inc., Osaka (JP)

(72) Inventor: Muneki Yamada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/724,639

(22) Filed: Dec. 23, 2019

(65) Prior Publication Data

US 2020/0213451 A1 Jul. 2, 2020

(30) Foreign Application Priority Data

Dec. 28, 2018 (JP) .............................. JP2018-248499

(51) Int. Cl.
*H04N 21/433* (2011.01)
*H04N 1/00* (2006.01)
*G06F 16/242* (2019.01)

(52) U.S. Cl.
CPC ....... *H04N 1/0009* (2013.01); *G06F 16/2448* (2019.01); *H04N 1/00037* (2013.01); *H04N 1/00076* (2013.01); *H04N 1/00411* (2013.01); *H04N 2201/0094* (2013.01)

(58) Field of Classification Search
CPC .............. H04N 1/0009; H04N 1/00411; G06F 16/2423; G06F 16/24564

USPC ....................................... 358/1.15, 1.16, 403
See application file for complete search history.

(56) References Cited

U.S. PATENT DOCUMENTS

| | | | | |
|---|---|---|---|---|
| 2010/0079781 A1* | 4/2010 | Yamamoto | ........... | H04N 1/2179 358/1.13 |
| 2011/0043845 A1* | 2/2011 | Nakagawa | ......... | H04N 1/32106 358/1.13 |

FOREIGN PATENT DOCUMENTS

JP 2005-175713 A 6/2005

\* cited by examiner

*Primary Examiner* — Jamares Q Washington
(74) *Attorney, Agent, or Firm* — IP Business Solutions, LLC

(57) ABSTRACT

The work environment provider provides a user with work environment for creating a search formula, creates the search formula in accordance with a user instruction received by the operation receiver through the operation device in the work environment, and causes the search formula storage device to store the created search formula. The determination device determines whether or not a log stored in the log storage device agrees with a search condition of the search formula stored in the search formula storage device. The notification device performs notification to a previously registered contact destination through the communication device upon determination by the determination device that the log agrees with the search condition. The notification device performs notification to a previously registered contact destination through the communication device upon determination by the determination device that the log agrees with the search condition.

7 Claims, 16 Drawing Sheets

Fig.2

| ALARM DETECTION LOG SEARCH FORMULA | | |
|---|---|---|
| TITLE | UPDATE DATE | |
| ☐ LOG SEARCH FORMULA (1) | 2018/1/1 | REGISTER |
| ☐ LOG SEARCH FORMULA (2) | 2018/2/1 | EDIT |
| | | DELETE |
| | | CANCEL |

Fig.6A

| ALARM DETECTION LOG SEARCH FORMULA | |
|---|---|
| TITLE | UPDATE DATE |
| C1 ☐ LOG SEARCH FORMULA (1) | 2018/1/1 |
| C2 ☐ LOG SEARCH FORMULA (2) | 2018/2/1 |

L1

IMPORT (B41)   CANCEL (B42)

| | ALARM DETECTION LOG SEARCH FORMULA | |
|---|---|---|
| | TITLE | UPDATE DATE |
| C1 ☐ | LOG SEARCH FORMULA (1) | 2018/1/1 |
| C2 ☑ | LOG SEARCH FORMULA (2) | 2018/2/1 |

L1

IMPORT (B41)   CANCEL (B42)

| SEARCH FORMULA: NOTIFICATION DESTINATION SETTING | | |
|---|---|---|
| NOTIFICATION DESTINATION ADDRESS | xxx@abc.com | ←E3 |
| SUBJECT | UNAUTHORIZED ACCESS DETECTED | ←E4 |
| | UPDATE (B61) CANCEL (B62) | |

SEARCH FORMULA: PASSWORD

PASSWORD

⎯E5

PASSWORD CONFIRMATION

⎯E6

UPDATE    CANCEL

| | ALARM DETECTION LOG SEARCH FORMULA | |
|---|---|---|
| | TITLE | UPDATE DATE |

C1 ☐ LOG SEARCH FORMULA (1)  2018/1/1      REGISTER —B1
C2 ☐ LOG SEARCH FORMULA (2)  2018/2/1      EDIT —B2
C3 ☐ LOG SEARCH FORMULA (3)  2018/3/1      DELETE —B3
                                      L2    CANCEL —B4

G9

ELECTRONIC DEVICE AND IMAGE FORMING APPARATUS PROVIDING USER WITH WORK ENVIRONMENT FOR CREATING SEARCH FORMULA WHOSE SEARCH IS TARGETED ON LOG

INCORPORATION BY REFERENCE

This application claims priority to Japanese Patent Application No. 2018-248499 filed on 28 Dec. 2018, the entire contents of which are incorporated by reference herein.

BACKGROUND

This disclosure relates to an electronic device and an image forming apparatus which save logs.

An electronic device such as a copier, a facsimile device, a printer, or a multifunction peripheral combining together a plurality of functions respectively included in the aforementioned devices typically stores, therein as logs, for example, an event history at a time of user log-in or setting change.

For the logs stored in the electronic device, the logs are subsequently transmitted to an external device such as a server and analyzed, thereby making it possible to investigate the presence or absence of unauthorized access or unexpected operation by an operator. For example, known is a technology for preventing erroneous change in setting items by the operator.

SUMMARY

As one aspect of this disclosure, a technology obtained by further improving the technology described above will be suggested.

An electronic device according to one aspect of this disclosure includes: a log storage device, a search formula storage device, a communication device, a display device, an operation device, and a control device. The log storage device stores a log. The search formula storage device stores a search formula whose search is targeted on the log stored in the log storage device. The communication device performs data communication with an external device. An instruction of a user is inputted through the operation device. The control device includes a processor, and through execution of a control program by the processor, functions as: an operation receiver, a work environment provider, a determination device, and a notification device. The operation receiver receives the instruction of the user. The work environment provider provides the user with work environment for creating the search formula, creates the search formula in accordance with the instruction of the user received by the operation receiver through the operation device in the work environment, and causes the search formula storage device to store the created search formula. The determination device determines whether or not the log stored in the log storage device agrees with a search condition of the search formula stored in the search formula storage device. The notification device performs notification to a previously registered contact destination through the communication device upon determination by the determination device that the log agrees with the search condition.

An image forming apparatus according to another aspect of this disclosure includes: the electronic device described above; and an image forming device forming an image on a recording medium.

BRIEF DESCRIPTION OF THE DRAWINGS

FIG. 2 is a diagram illustrating one example of an operation screen displayed at a display device.

Figure 9:
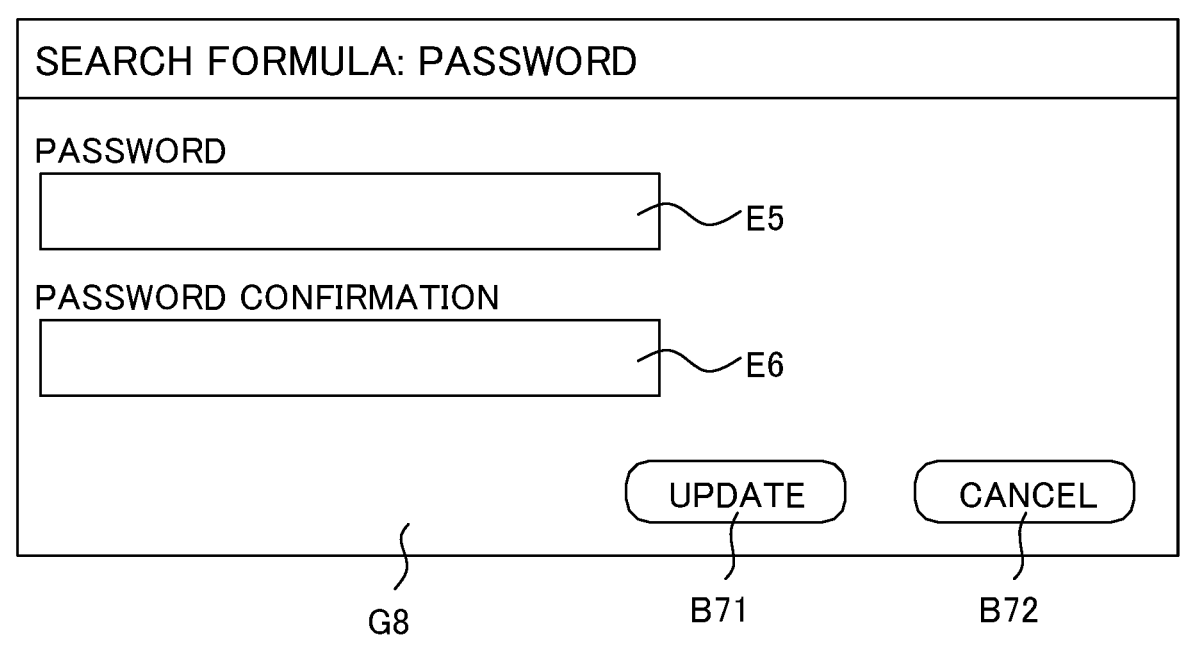

FIGS. 3 to 10 are diagrams illustrating other examples of the operation screen displayed at the display device.

DETAILED DESCRIPTION

Figure 1:
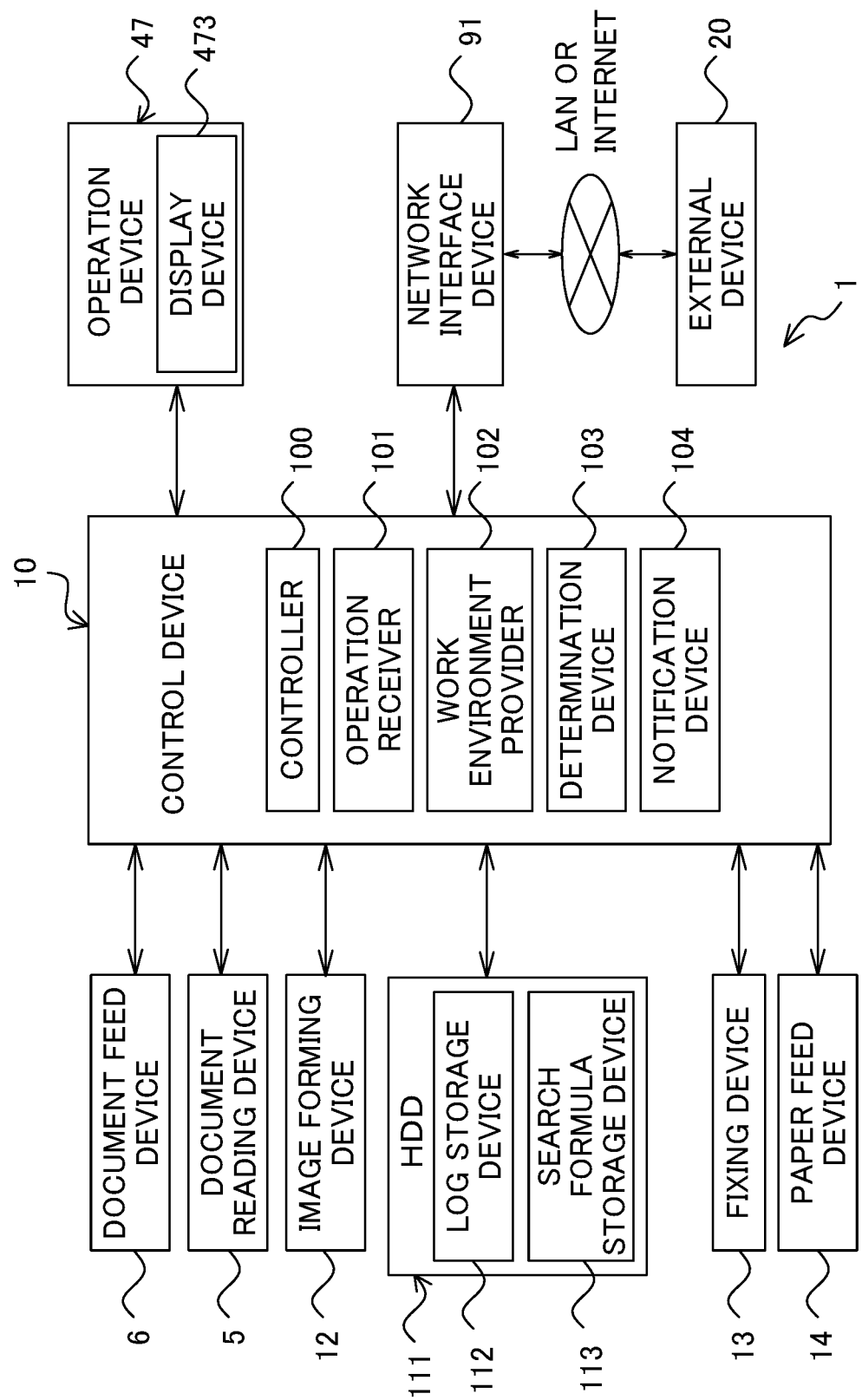
FIG. 1 is a functional block diagram schematically illustrating main inner configuration of an image forming apparatus as an electronic device according to a first embodiment of this disclosure.

Hereafter, an electronic device and an image forming apparatus according to one embodiment of this disclosure will be described with reference to the drawings. FIG. 1 is a functional block diagram schematically illustrating main inner configuration of the electronic device according to a first embodiment of this disclosure.

The electronic device according to the first embodiment is, for example, an image forming apparatus 1. The image forming apparatus 1 is a multifunction peripheral combining together a plurality of functions such as, for example, a copy function, a printer function, a scan function, and a facsimile function. The image forming apparatus 1 includes: a control device 10, a document feed device 6, a document reading device 5, an image forming device 12, a hard disk drive (HDD) 111, a fixing device 13, a paper feed device 14, an operation device 47, and a network interface device 91.

A case where document reading operation is performed in the image forming apparatus 1 will be described. The document reading device 5 optically reads an image of a document conveyed by the document feed device 6 or a document loaded on contact glass to thereby generate image data. The image data generated by the document reading device 5 is saved into an image memory or the like.

A case where image formation operation is performed in the image forming apparatus 1 will be described. Based on, for example, the image data generated through the document reading operation or image data received from a computer serving as an external device 20 connected to a network, the image forming device 12 forms a toner image on recording paper serving as a recording medium fed from the paper feed device 14.

The HDD 111 is a large-capacity storage device for storing, for example, the image data transmitted from the external device 20 and includes a log storage device 112 and a search formula storage device 113. The log storage device 112 is a database which stores logs. The search formula storage device 113 stores search formulae whose search is targeted on the logs stored in the log storage device 112. The log here refers to a database indicating a history of access to the image forming apparatus 1, for example, a history of logging in the image forming apparatus 1 or a history of activation of the image forming apparatus 1 and a database indicating a history of use of the image forming apparatus 1, for example, a history of printing or a history of transmission.

The fixing device 13 heats and pressurizes the recording paper, on which the toner image has been formed by the image forming device 12, to thereby fix the toner image on the recording paper. The recording paper subjected to fixing processing is discharged onto a discharge tray. The paper feed device 14 includes a paper feed cassette.

The operation device 47 receives, for various types of operation and processing executable by the image forming apparatus 1, instructions, such as an image formation operation execution instruction, which are to be inputted from an operator. The operation device 47 includes a display device 473 which displays, for example, an operation guide to an operator.

The display device 473 has a touch panel function, and the operator can touch buttons or keys displayed on a screen of the display device 473 to operate the image forming apparatus 1.

The network interface device 91 performs various types of data transmission and reception to and from the external device 20 such as a terminal device or a server in a local area or on the Internet. Note that the network interface device 91 is one example of a communication device in the scope of the claims.

The control device 10 includes a processor, a random access memory (RAM), a read only memory (ROM), and a dedicated hardware circuit. The processor is, for example, a central processing unit (CPU), an application specific integrated circuit (ASIC), or a micro processing unit (MPU).

Through operation performed by the processor in accordance with control programs stored in the HDD 111, the control device 10 functions as a controller 100, an operation receiver 101, a work environment provider 102, a determination device 103, and a notification device 104. Note that, however, these controller 100, etc. can be each formed by a hardware circuit without depending on operation performed by the control device 10 in accordance with the control programs. Hereinafter, unless otherwise is specified, the same applies to each of the embodiments.

The controller 100 is in charge of overall operation control of the image forming apparatus 1. The controller 100 is connected to the document feed device 6, the document reading device 5, the image forming device 12, the HDD 111, the fixing device 13, the paper feed device 14, the operation device 47, and the network interface device 91, and performs, for example, driving control of these devices. For example, the controller 100 controls operation of the image forming device 12 to thereby form an image on a recording medium.

The operation receiver 101 receives user instructions inputted through the operation device 47. For example, the operation receiver 101 receives the instruction in accordance with user input to a hard key included in the operation device 47. The operation receiver 101 further receives, through the touch panel function included in the display device 473, the instruction in accordance with the user input to an operation screen displayed at the display device 473.

Through, for example, processing of displaying, at the display device 473, a text in accordance with the input received by the operation receiver 101, the work environment provider 102 provides the user with work environment for creating a search formula for a database (the log storage device 112 here). The work environment provider 102 creates a search formula in accordance with an instruction inputted through operation of the display device 473 by the user under the aforementioned work environment. The work environment provider 102 stores, into the search formula storage device 113, the search formula created by the user under the aforementioned work environment.

The determination device 103 reads out the search formula from the search formula storage device 113 and determines whether or not the log stored in the log storage device 112 agrees with a search condition of the read search formula.

Upon determining by the determination device 103 that the log agrees with the aforementioned search condition, the notification device 104 notifies, via the network interface device 91, a previously registered contact destination (for example, an administrator) that the log agrees with the aforementioned search condition.

Next, for example, procedures for creating a search formula for a log by the user will be described. Through operation of the operation device 47, the user provides an instruction for creating the search formula for the log, and when the operation receiver 101 receives the instruction, the work environment provider 102 causes the display device 473 to display an operation screen G1 titled as "ALARM DETECTION LOG SEARCH FORMULA" as illustrated in FIG. 2.

As a search formula list L1, the work environment provider 102 displays, on the first line of the operation screen G1, a search formula whose title is "Log search formula (1)" and whose update date is "2018/1/1" and displays, on the second line of the operation screen G1, a search formula whose title is "Log search formula (2)" and whose update date is "2018/2/1". The work environment provider 102 also displays check boxes C1 and C2 at the heads of the respective rows. The search formulae indicated are those stored in the search formula storage device 113.

The work environment provider 102 also displays, on the operation screen G1, selection buttons B1 to B4 respectively marked as "REGISTER", "EDIT", "DELETE", and "CANCEL".

Here, when the user selects the selection button B1 marked as "REGISTER", the work environment provider 102 receives, through the touch panel function, an instruction for registering the search formula, and the work environment provider 102 performs processing for creating a new search formula and newly registering the new search formula into the search formula storage device 113. Note that this processing will be described in detail later on with reference to FIGS. 3 to 10.

When the user selects the selection button B2 marked as "EDIT", the work environment provider 102 receives, through the touch panel function, an instruction for editing the existing search formula, and the work environment provider 102 edits contents of the search formula which has been specified by the user and which is stored in the search formula storage device 113. For example, when the user selects the selection button B2 after putting a check in the check box C1, the search formula titled as "SEARCH FORMULA (1)" can be edited.

When the user selects the selection button B3 marked as "DELETE", the work environment provider 102 receives, through the touch panel function, an instruction for deleting the search formula, and the work environment provider 102 deletes, from the search formula storage device 113, the search formula which has been specified by the user and which is stored in the search formula storage device 113. For example, when the user selects the selection button B3 after putting a check in the check box C2, the work environment provider 102 receives an instruction corresponding to these operations and the work environment provider 102 deletes the search formula titled as "SEARCH FORMULA (2)" from the search formula storage device 113.

When the user selects the selection button B4 marked as "CANCEL", the work environment provider 102 receives a cancellation instruction through the touch panel function. In this case, the work environment provider 102 returns the operation screen displayed at the display device 473 to the operation screen which was displayed immediately before the display of the operation screen G1.

Figure 3:
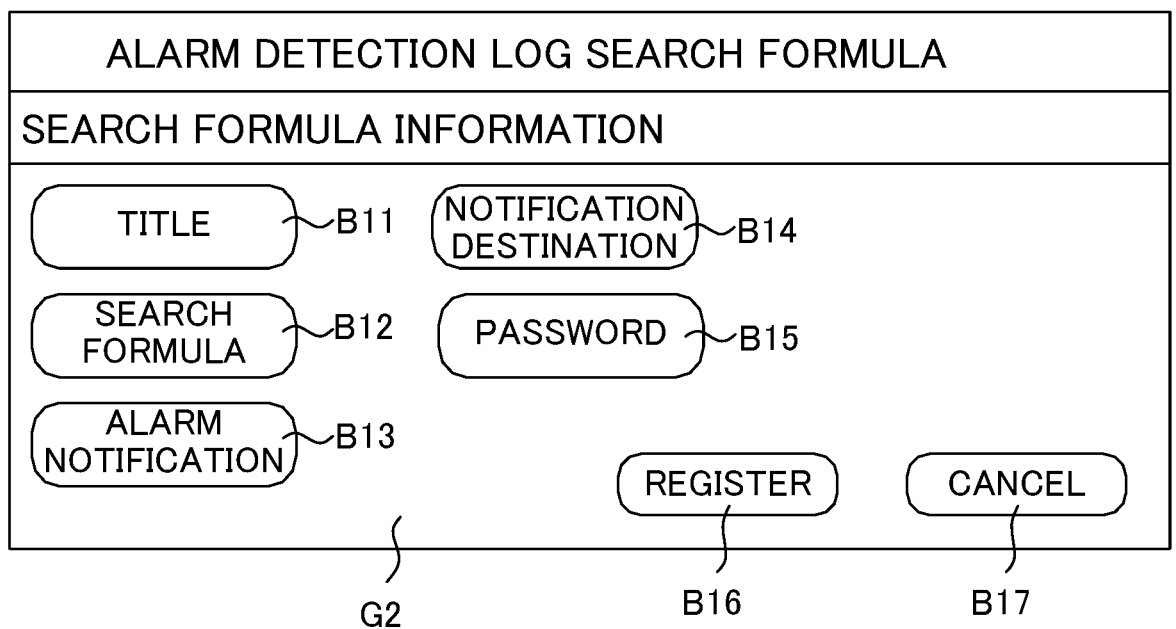

When the operation receiver 101 receives the user's touch operation on the selection button B1 marked as "REGISTER", the work environment provider 102 receives, through the touch panel function, an instruction for registering a search formula, that is, an instruction for creating a new search formula and storing the new search formula into the search formula storage device 113. In this case, the work environment provider 102 causes the display device 473 to display an operation screen G2 titled as "ALARM DETECTION LOG SEARCH FORMULA" and sub-titled as "SEARCH FORMULA INFORMATION" as illustrated in FIG. 3.

The work environment provider 102 displays, on the operation screen G2, selection buttons B11 to B15 respectively marked as "TITLE", "SEARCH FORMULA", "ALARM NOTIFICATION", "NOTIFICATION DESTINATION", and "PASSWORD" and selection buttons B16 and B17 respectively marked as "REGISTER" and "CANCEL".

Figure 4A:
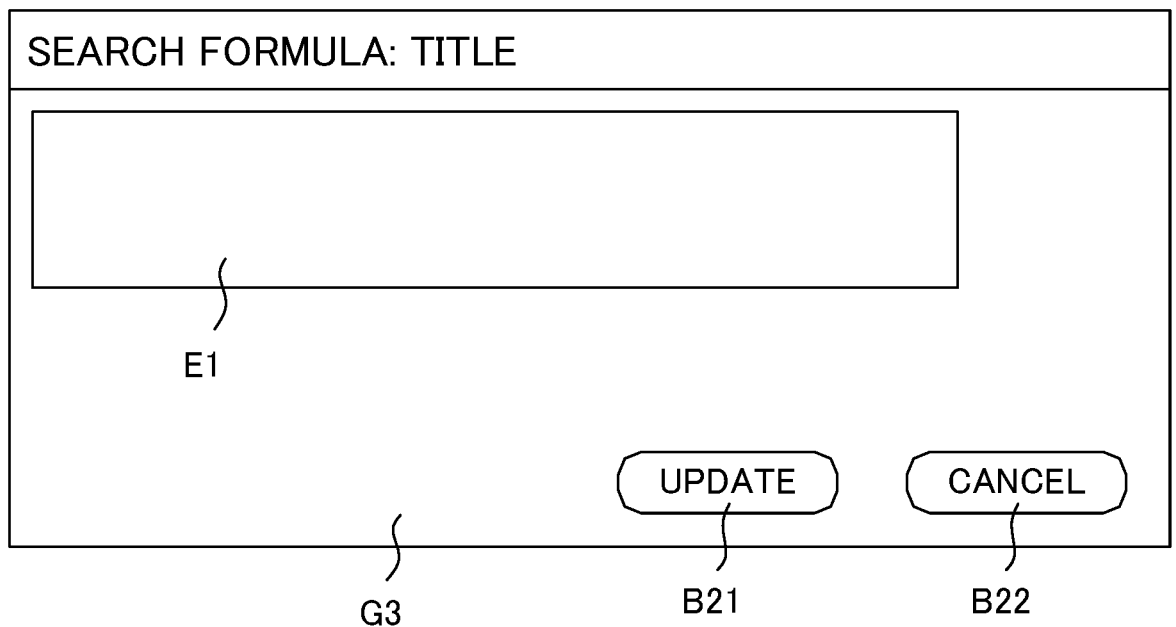

Here, when the operation receiver 101 receives, through the touch panel function, the user's touch operation on the selection button B11 marked as "TITLE", the work environment provider 102 receives an instruction corresponding to the selection button B11, and the work environment provider 102 causes the display device 473 to display an operation screen G3 titled as "SEARCH FORMULA AND TITLE" as illustrated in an example of FIG. 4A and also causes the display device 473 to display a software keyboard for inputting texts, thereby providing the user with work environment for inputting the title of the search formula.

Figure 4B:
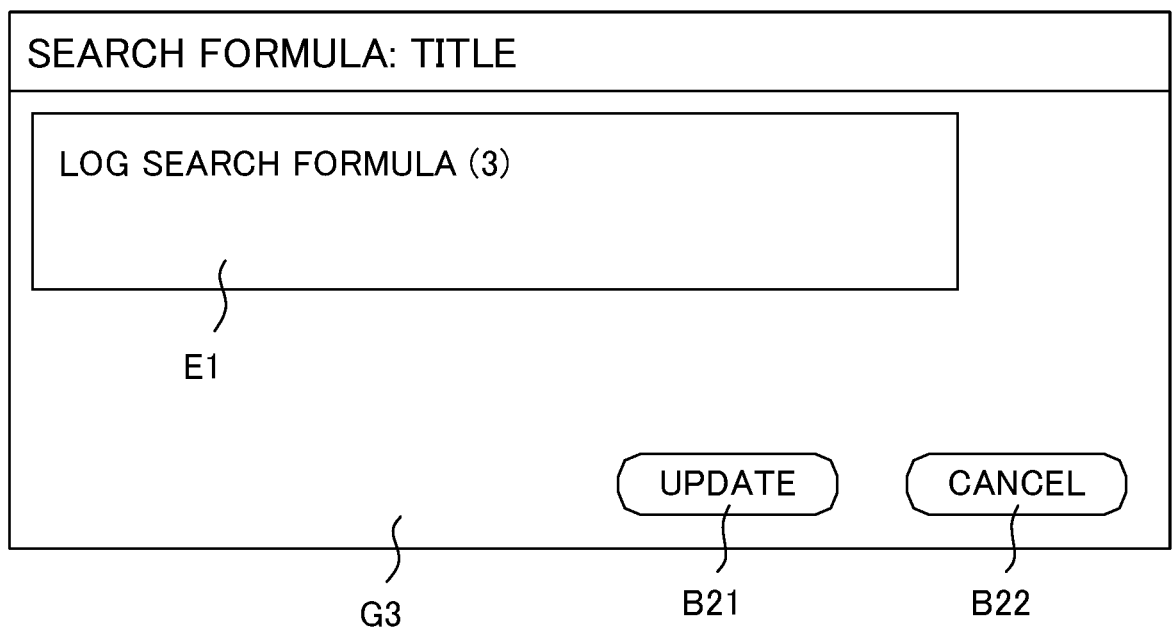

The work environment provider 102 displays, on the operation screen G3, a display area E1 for displaying the texts received by the operation receiver 101 and inputted by the user, and also displays selection buttons B21 and B22 respectively marked as "UPDATE" and "CANCEL". When the title of the search formula has been inputted through the operation of the operation device 47 by the user and received by the operation receiver 101, the work environment provider 102 receives the title of the search formula and displays, in the display area E1 of the operation screen G3, the received title of the search formula. FIG. 4B is a diagram illustrating a state in which "LOG SEARCH FORMULA (3)" indicating the received title of the search formula is displayed in the display area E1.

While the operation screen G3 is in a state as illustrated in FIG. 4B, when the operation receiver 101 receives the user's update instruction corresponding to the selection button B21 marked as "UPDATE", the work environment provider 102 receives an instruction for storing, as a title of a newly created search formula, the "LOG SEARCH FORMULA (3)" displayed in the display area E1, causing the search formula storage device 113 to store the title of the search formula. The work environment provider 102 returns the operation screen displayed at the display device 473 to the operation screen G2 illustrated in FIG. 3.

Figure 5A:
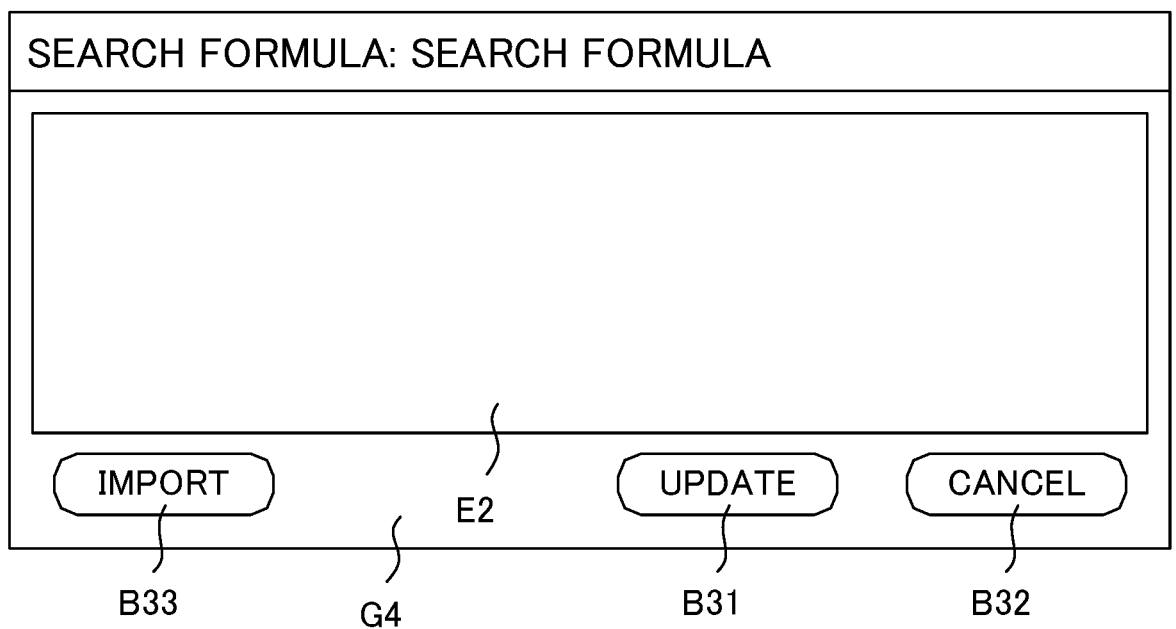

Moreover, when the operation receiver 101 receives the user's instruction corresponding to the selection button B12 marked as "SEARCH FORMULA" illustrated in FIG. 3 while the operation screen G2 is displayed, the work environment provider 102 causes the display device 473 to display an operation screen G4 titled as "SEARCH FORMULA: SEARCH FORMULA" as illustrated in FIG. 5A and also causes the display device 473 to display a software keyboard, thereby providing the user with work environment for creating the search formula for the database.

Figure 5B:
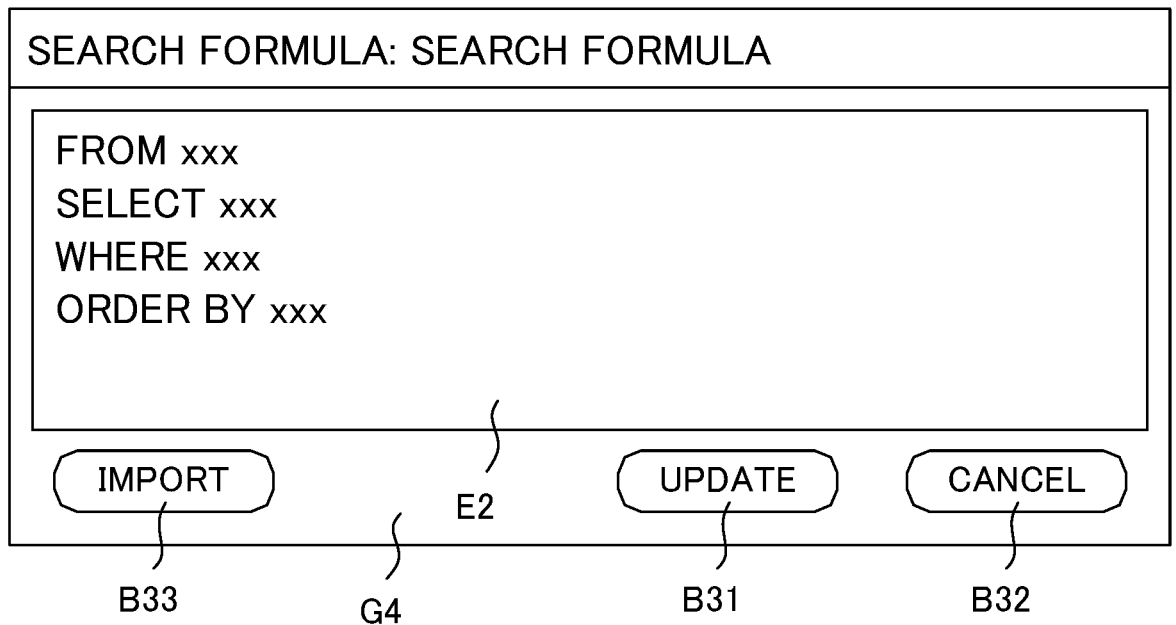

The work environment provider 102 displays, on the operation screen G4, a display area E2 for displaying texts received by the operation receiver 101 and inputted by the user and also displays, on the operation screen G4, selection buttons B31 to B33 respectively marked as "UPDATE", "CANCEL", and "IMPORT". FIG. 5B illustrates a state in which a structured query language (SQL) syntax is displayed in the display area E2 as the search formula inputted through the operation of the operation device 47 by the user and received by the operation receiver 101. For example, this search formula specifies a search target with "FROM", specifies, with "SELECT", a data string to be searched, specifies a conditional expression with "WHERE", and specifies, with "ORDER BY", the way the extracted data is arranged.

When the operation receiver 101 receives the user's update instruction corresponding to the selection button B31 marked as "UPDATE" while the SQL syntax as the search formula is inputted, the work environment provider 102 associates the SQL syntax displayed in the display area E2 with an owner name (that is, a login user name) and a title of the search formula (the title inputted by the user while the operation screen G3 illustrated in FIG. 4 is displayed) and further causes the search formula storage device 113 to store the created newly search formula where the log storage device 112 is defined as the database to be searched. The work environment provider 102 returns the operation screen displayed at the display device 473 to the operation screen G2 illustrated in FIG. 3.

As a result of operating the operation device 47 by the user while the operation screen G4 is displayed, a search formula indicating search conditions for starting alarm notification is inputted through the SQL syntax, targeting on each of the logs stored in the log storage device 112. The user inputs, as the search conditions for starting the alarm notification, search formulae indicating, for example, (i) unauthorized access has been performed (for example, the image forming apparatus 1 has been activated or login processing has been executed outside predetermined business hours) and (ii) unexpected use of the image forming apparatus 1 (for example, printing of over a predefined number of pages) has been performed.

When the operation receiver 101 receives the user's touch operation on the selection button B33 marked as "IMPORT" illustrated in FIGS. 5A and 5B, the work environment provider 102 causes the display device 473 to display an operation screen G5 titled as "ALARM DETECTION LOG SEARCH FORMULA" as illustrated in FIG. 6A.

The work environment provider 102 displays, on the operation screen G5, as is the case with the operation screen G1 illustrated in FIG. 2, the search formula list L1 and also displays check boxes C1 and C2 as well as selection buttons B41 and B42 respectively marked as "IMPORT" and "CANCEL".

When the user selects the selection button B41 marked as "IMPORT" after selecting the search formula by putting a check in either of the check boxes C1 and C2, the operation receiver 101 receives, through the touch panel function, the selection of the search formula corresponding to either of the check boxes C1 and C2 selected by the user. The work environment provider 102 reads out the selected search formula from the search formula storage device 113 and displays, in the display area E2 of the operation screen G4, the read search formula as illustrated in FIG. 5B.

For example, when the user selects the selection button B41 after putting a check in the check box C2 as illustrated in FIG. 6B while the operation screen G5 is displayed, the operation receiver 101 receives, through the touch panel function, the selection of the search formula corresponding to the check box C2 selected by the user. The work environment provider 102 reads out, from the search formula storage device 113, the search formula titled as "SEARCH FORMULA (2)" and corresponding to the check box C2 and causes the display device 473 to display, as illustrated in FIG. 5B, the operation screen G4 where the read search formula is displayed in the display area E2. At this point, the work environment provider 102 turns into a state in which the work environment provider 102 can receive, through the touch panel function, an instruction for editing the search formula titled as "SEARCH FORMULA (2)" by the user to create a new search formula.

Figure 7:
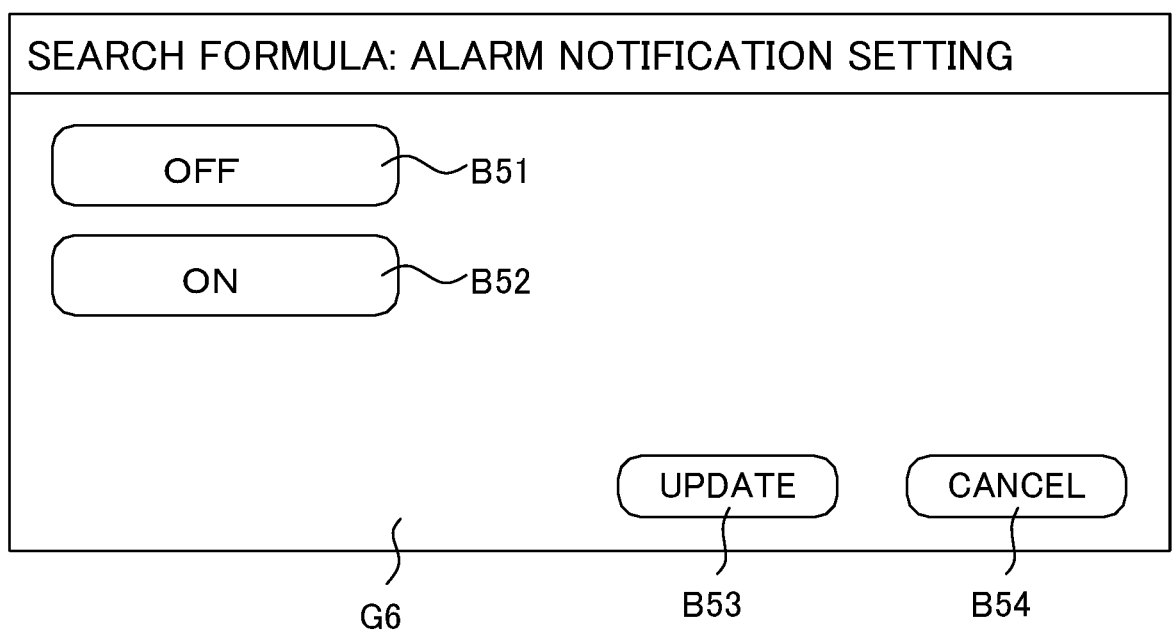

Moreover, when the operation receiver 101 detects, through the touch panel function, the user's touch operation on the selection button B13 marked as "ALARM NOTIFICATION" on the operation screen G2 illustrated in FIG. 3, the work environment provider 102 receives an instruction for creating alarm notification corresponding to the selection button B13. At this point, the work environment provider 102 causes the display device 473 to display an operation screen G6 titled as "SEARCH FORMULA: ALARM NOTIFICATION SETTING" as illustrated in FIG. 7 to thereby provide the user with opportunities to select whether or not to notify detection of the log in agreement with the search condition of the newly created search formula, if any.

The work environment provider 102 displays, on the operation screen G6, selection buttons B51 and B52 respectively marked as "OFF" and "ON" and selection buttons B53 and B54 respectively marked as "UPDATE" and "CANCEL". When the operation receiver 101 receives an instruction corresponding to the selection button B53 marked as "UPDATE" after receiving an instruction corresponding to the selection button B51 marked as "OFF", the work environment provider 102 causes the search formula storage device 113 to store information "ALARM IS NOT TO BE NOTIFIED" in correspondence with the search formula newly stored in the search formula storage device 113.

Moreover, when the operation receiver 101 receives an instruction corresponding to the selection button B53 marked as "UPDATE" after receiving an instruction corresponding to the selection button B52 marked as "ON", the work environment provider 102 causes the search formula storage device 113 to store information "ALARM IS TO BE NOTIFIED" in correspondence with the search formula newly stored in the search formula storage device 113.

Figure 8A:
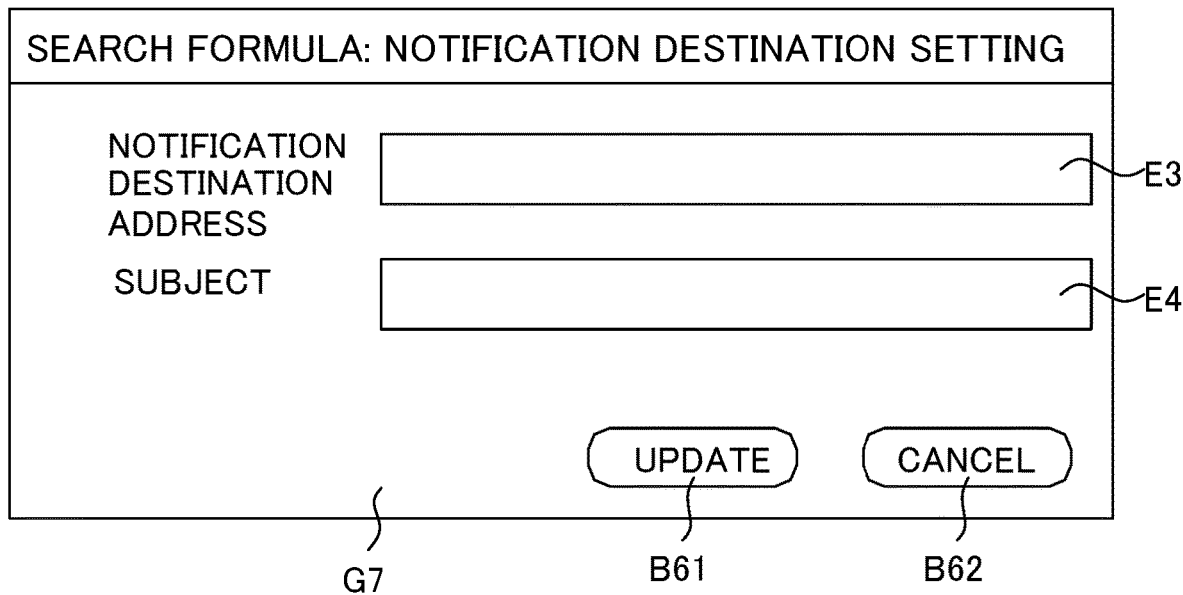

Moreover, when the operation receiver 101 receives an instruction corresponding to the selection button B14 marked as "CONTACT DESTINATION" based on the user's touch operation on the operation screen G2 illustrated in FIG. 3, the work environment provider 102 causes the display device 473 to display an operation screen G7 titled as "SEARCH FORMULA: NOTIFICATION DESTINATION SETTING" as illustrated in FIG. 8A and also causes the display device 473 to display a software board to thereby provide the user with work environment for setting a mail address serving as a contact destination which is to be notified of detection of the log in agreement with the search condition of the newly created search formula, if any.

The work environment provider 102 displays, on the operation screen G7, display areas E3 and E4 for displaying texts received by the operation receiver 101 and inputted by the user as well as selection buttons B 61 and 62 respectively marked as "UPDATE" and "CANCEL". The work environment provider 102 displays, in the display area E3, a mail address inputted by the user and displays, in the display area E4, a subject of the mail inputted by the user. FIG. 8B illustrates a state in which the work environment provider 102 displays, in the display area E3, the notification destination address inputted by the user and displays the subject in the display area E4.

When the operation receiver 101 receives, from the user, an update instruction corresponding to the selection button B61 marked as "UPDATE" while the operation screen G7 is in a state as illustrated in FIG. 8B, the work environment provider 102 causes the search formula storage device 113 to store the mail address displayed in the display area E3 and the subject displayed in the display area E4 in correspondence with the search formula newly stored in the search formula storage device 113. Then the work environment provider 102 returns the operation screen displayed at the display device 473 to the operation screen G2 illustrated in FIG. 3.

Moreover, when the operation receiver 101 receives, through the touch panel function, an instruction corresponding to the selection button B15 marked as "PASSWORD" while the operation screen G2 illustrated in FIG. 3 is displayed, the work environment provider 102 causes the display device 473 to display an operation screen G8 titled as "SEARCH FORMULA: PASSWORD" as illustrated in an example of FIG. 9 and also causes the display device 473 to display a software board to thereby provide the user with work environment for setting a password for providing permission for editing the newly searched search formula.

The work environment provider 102 displays, on the operation screen G8, display areas E5 and E6 for displaying a password received by the operation receiver 101 and inputted by the user as well as selection buttons B71 and B72 marked as "UPDATE" and "CANCEL". The work environment provider 102 causes the search formula storage device 113 to store, as the password for providing the permission for editing the newly created search formula, the password inputted by use of the operation screen G8 through the operation of the operation device 47 by the user.

When the users set respective contents as described above based on operation of the selection buttons B11 to 13, the work environment provider 102 causes the display device 473 to display the operation screen G2 every time the setting based on each selection button ends. However, for example, when the user operates the selection button B16 indicated as "REGISTER" upon ending of all the settings based on the operation of the selection buttons B11 to B13, the operation receiver 101 receives, through the touch panel, a search formula registration instruction and the work environment provider 102 causes the search formula storage device 113 to store the search formula in correspondence with all the settings made based on the operation of the selection buttons B11 to 13, that is, associating the search formula stored through the setting made based on the operation of the selection button B12 with all the contents set through operation of the other selection buttons.

As described above, when the search formula titled as "LOG SEARCH FORMULA (3)" has been newly stored into the search formula storage device 113, in a case where the operation receiver 101 receives an instruction for creating a search formula after inputting of this instruction by the user, the work environment provider 102 causes the display device 473 to display an operation screen G9 titled as "ALARM DETECTION LOG SEARCH FORMULA" as illustrated in FIG. 10. The work environment provider 102 displays, on the operation screen G9, a search formula list L2. The search formula list L2 differs from the search formula list L1 illustrated in FIG. 2 in that a search formula titled as "LOG SEARCH FORMULA (3)" with an update date "2018/3/1" is displayed on the third line. The work environment provider 102 also displays a check box C3 at the head of the third line.

Figure 11:
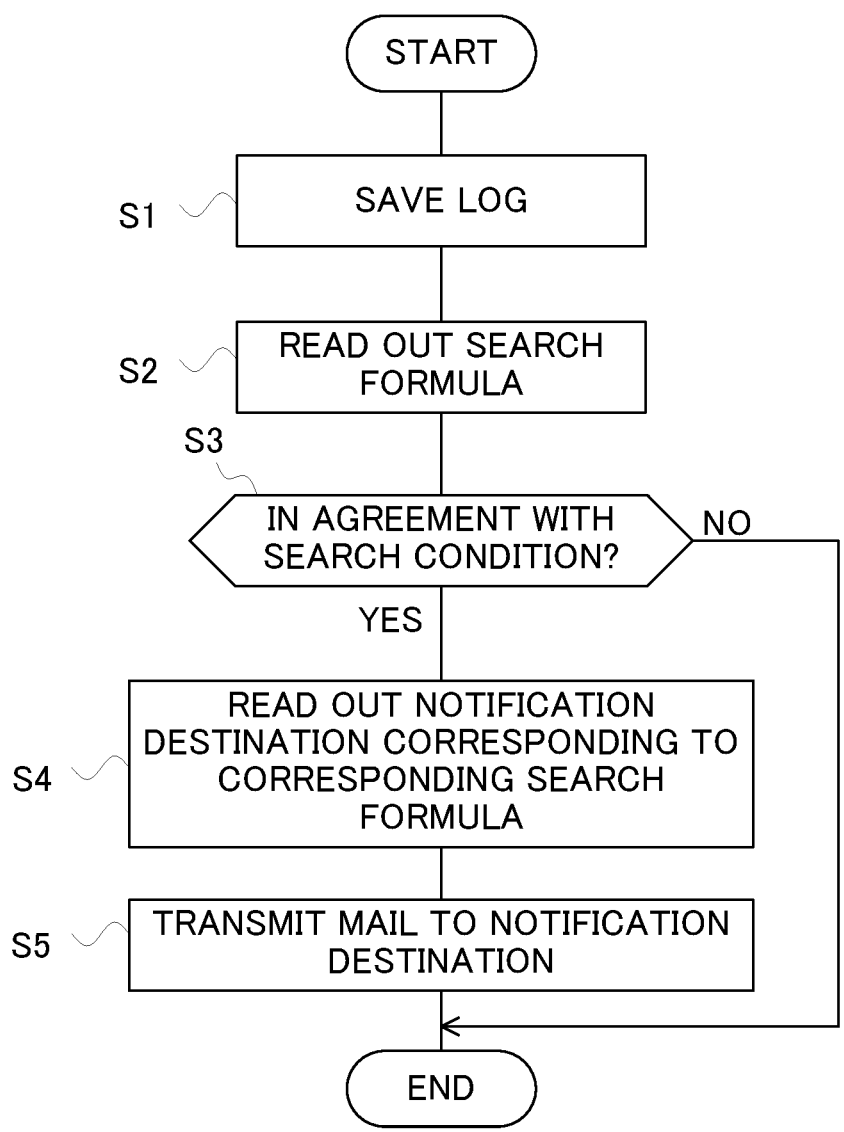
FIG. 11 is a flowchart illustrating one example of processing executed by a control device of the image forming apparatus as the electronic device according to the first embodiment.

Next, one example of processing executed by the control device 10 of the image forming apparatus 1 according to the first embodiment will be described based on a flowchart illustrated in FIG. 11. Note that this processing is executed at a time point at which any event to be left as a log has occurred.

When the controller 100 saves, into the log storage device 112, a log indicating an event occurring (step S1), the determination device 103 reads out the search formula stored in the search formula storage device 113 (step S2) and determines whether or not the log stored in the log storage device 112 in step S1 agrees with any of search conditions of the read search formula (step S3). Note that the search formula read out by the determination device 103 in step S2 is limited to a search formula for which "ON" has been set on the operation screen G6 illustrated in FIG. 7 and which is stored in the search formula storage device 113 in correspondence with the information "ALARM IS TO BE NOTIFIED".

Upon determining by the determination device 103 that the aforementioned log agrees with any of the search conditions (YES in step S3), the notification device 104 reads out, from the search formula storage device 113, a notification destination address and a subject stored in correspondence with the search formula in agreement with the aforementioned log (step S4) and transmits, through the network interface device 91, a mail added with the read subject to the read notification destination address (step S5), ending this processing.

On the other hand, upon determining by the determination device 103 that the aforementioned log does not agree with any of the search conditions (NO in step S3), the notification device 104 ends this processing.

Upon occurrence of an event such as unauthorized access or unexpected operation by an operator, it is preferable that this occurrence be notified to the administrator or the like as soon as possible or immediately if possible. A possible method to realize this includes improving firmware and setting a search condition for detecting a log indicating an event as described above and upon detecting the log corresponding to the aforementioned search condition (for example, a log indicating the authorized access), notifying this to the previously registered contact destination, but this method faces a problem of increased labors and costs.

Moreover, events for which a manufacturer side requires notification does not necessarily agree with events for which a user side requires notification. Thus, when there is a request from the user, additional firmware modification is required, also raising a problem of an additional cost increase.

For example, when logs stored in an electronic device such as an image forming apparatus are managed by use of a general-purpose database, a database language such as, for example, SQL is used to get access to the logs. Therefore, if the user can freely create an SQL syntax, etc. in the electronic device and the user can increase detection targets as desired, it is possible to detect any log deviating from the product specifications. That is, it is possible to detect any event for which the user side requires notification.

Therefore, according to the first embodiment, upon detecting any log in agreement with the search condition of the search formula (for example, the SWL syntax) created by the user, it is notified to the previously registered contact destination (for example, the administrator). That is, it is possible to detect any log in agreement with a search condition created by the user even without the search formula previously prepared on the manufacturer side of the image forming apparatus 1. Moreover, since the aforementioned notification is performed not via the server or the like but directly from the image forming apparatus 1, upon occurrence of an event for which the user side requires notification, this can be quickly notified to, for example, the administrator.

Moreover, determining by the determination device 103 whether or not the log agrees with the aforementioned search condition is performed when the log is saved into the log storage device 112, thus making it possible to immediately contact, for example, the administrator upon occurrence of an event such as the unauthorized access or the unexpected operation by the operator.

Alternatively, as another embodiment, the aforementioned determination may be performed by the determination device 103 not when the log is saved into the log storage device 112 but when a predefined number of logs are cumulated or at every predefined period.

Figure 12:
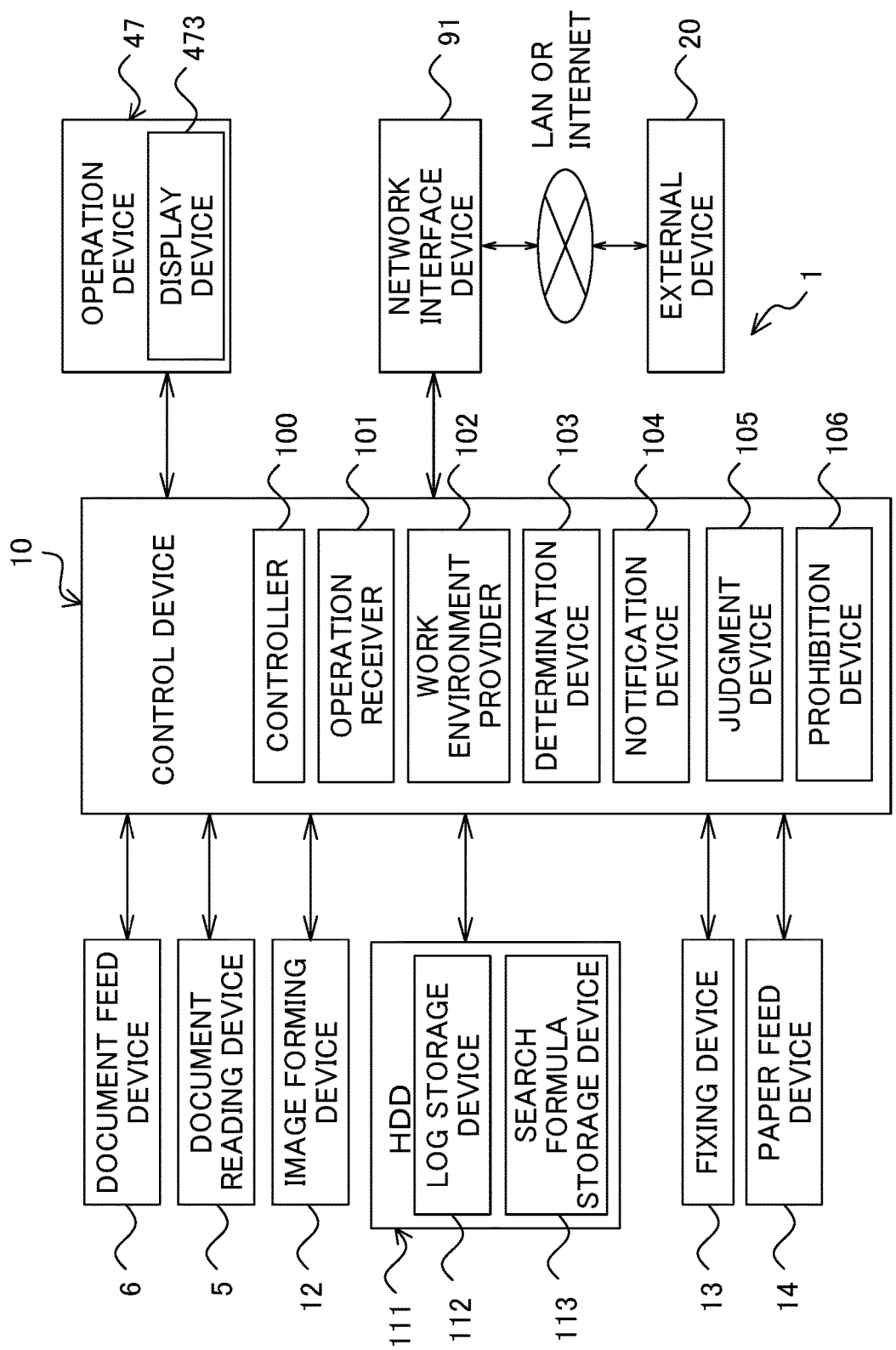
FIG. 12 is a functional block diagram schematically illustrating main inner configuration of an image forming apparatus as an electronic device according to a second embodiment.

FIG. 12 is a functional block diagram schematically illustrating main inner configuration of an image forming apparatus as an electronic device according to a second embodiment. The image forming apparatus according to the second embodiment has a control device 10 provided with a judgement device 105 and a prohibition device 106, which is different from the image forming apparatus illustrated in FIG. 1. Other configuration of the image forming apparatus according to the second embodiment are same as that of the image forming apparatus 1 according to the first embodiment. The control device 10 further functions as the judgement device 105 and the prohibition device 106 through operation performed by the processor in accordance with the control programs stored in the HDD 111. Note that, however, it is also possible to form each of the judgement device 105 and the prohibition device 106 by a hardware circuit without depending on the operation performed by the control device 10 in accordance with the control program.

The judgement device 105 judges whether or not the search formula includes a predefined character string (for example, INSERT, UPDATE, or DELETE as an SQL syntax) which permits database edit. For example, when the operation receiver 101 receives an instruction, from the user, corresponding to the selection button B31 marked as "UPDATE" illustrated in FIG. 5B, the judgement device 105 judges, at this timing, whether or not the SQL syntax (for example, the search formula displayed in the display area E2 illustrated in FIG. 5B) as the search formula received by the operation receiver 101 at this timing includes the predefined character string described above.

The prohibition device 106 prohibits the search formula, which has been judged to include the aforementioned character string by the judgement device 105, from being stored into the search formula storage device 113.

Permitting limitless SQL creation permits the database edit, which is not preferable. Thus, the storage of a search formula including any of character strings "INSERT", "UPDATE", and "DELETE" which permit operation such as data addition, update, and deletion is prohibited.

This disclosure is not limited to the configuration of the embodiments described above and thus permits various modifications. In addition, the embodiments have been described above, referring to the multifunction peripheral as an image forming apparatus as one embodiment of an electronic device according to this disclosure. However, this is just one example and for example, a different image forming apparatus or a different electronic device having, for example, a copy function, a printer function, or a facsimile function may be used.

Moreover, the aforementioned configuration and processing of the embodiments described above with reference to FIGS. 1 to 12 form just one embodiment of this disclosure and this disclosure is not limited to the aforementioned configuration and processing in any manner.

While this disclosure has been described in detail with reference to the embodiments thereof, it would be apparent to those skilled in the art the various changes and modifications may be made therein within the scope defined by the appended claims.

What is claimed is:

1. An electronic device comprising:
   a log storage device storing a log;
   a search formula storage device storing a search formula whose search is targeted on the log stored in the log storage device;
   a communication device performing data communication with an external device;
   an operation device through which an instruction of a user is inputted; and
   a control device including a processor, and through execution of a control program by the processor, functioning as:
      an operation receiver receiving the instruction of the user through the operation device;
      a work environment provider providing the user with work environment for creating the search formula, creating the search formula in accordance with the instruction of the user received by the operation receiver through the operation device in the work environment, and causing the search formula storage device to store the created search formula;
      a determination device determining whether or not the log stored in the log storage device agrees with a search condition of the search formula stored in the search formula storage device; and
      a notification device performing notification to a previously registered contact destination through the communication device upon determination by the determination device that the log agrees with the search condition, wherein
   the control device further functions as:
      a judgment device judging whether or not the search formula includes a predefined character string for permitting edit of data stored in the log storage device; and
      a prohibition device prohibiting storage of the search formula into the search formula storage device upon judgment by the judgment device that the search formula includes the predefined character string.

2. The electronic device according to claim 1, wherein upon saving of the log into the log storage device, the determination device determines whether or not the log agrees with the search condition of the search formula stored in the search formula storage device.

3. The electronic device according to claim 1, wherein the work environment provider creates the search formula formed by an SQL syntax.

4. The electronic device according to claim 1, further comprising
   a display device, wherein
   the work environment provider causes the display device to display an operation screen for inputting the search formula as the work environment.

5. The electronic device according to claim 1, wherein the notification device does not perform the notification upon determination by the determination device that the log does not agree with the search condition.

6. The electronic device according to claim 1, wherein the log is at least one of a history of access to the electronic device and a history of use of the electronic device.

7. An image forming apparatus comprising:
   the electronic device according to claim 1; and
   an image forming device forming an image on a recording medium.

* * * * *